(12) United States Patent  
Jagow et al.

(10) Patent No.: US 10,433,476 B2  
(45) Date of Patent: Oct. 8, 2019

(54) IMPLEMENT FRAME MOUNTED VARIABLE RATE SINGULATING METERS

(71) Applicant: Bourgault Industries Ltd., St. Brieux (CA)

(72) Inventors: Scot Jagow, St. Brieux (CA); David Corriveau, St. Brieux (CA); Robert Klenz, St. Brieux (CA); Scott Gerbrandt, St. Brieux (CA)

(73) Assignee: Bourgault Industries Ltd., St. Brieux (CA)

( * ) Notice: Subject to any disclaimer, the term of this patent is extended or adjusted under 35 U.S.C. 154(b) by 0 days.

(21) Appl. No.: 16/194,996

(22) Filed: Nov. 19, 2018

(65) Prior Publication Data

US 2019/0082587 A1 Mar. 21, 2019

Related U.S. Application Data

(62) Division of application No. 15/375,926, filed on Dec. 12, 2016, now abandoned.

(30) Foreign Application Priority Data

Nov. 24, 2016 (CA) ...................................... 2949571

(51) Int. Cl.
*A01C 7/20* (2006.01)
*A01C 5/06* (2006.01)
(Continued)

(52) U.S. Cl.
CPC .............. *A01C 7/201* (2013.01); *A01C 5/068* (2013.01); *A01C 7/205* (2013.01); *A01C 7/206* (2013.01);
(Continued)

(58) Field of Classification Search
CPC .......... A01C 5/064; A01C 5/068; A01C 7/201
See application file for complete search history.

(56) References Cited

U.S. PATENT DOCUMENTS 2,611,331 A * 9/1952 O'Neil ..................... A01C 7/06
111/187
3,177,830 A * 4/1965 Zimmerman ............ A01C 5/06
111/194
(Continued)

FOREIGN PATENT DOCUMENTS

DE 3122713 C1 * 10/1982 ............. A01C 5/068
EP 0216057 A1 4/1987
(Continued)

*Primary Examiner* — Alicia Torres
(74) *Attorney, Agent, or Firm* — Frost Brown Todd LLC

(57) ABSTRACT

A seeding apparatus has a frame and a plurality of furrow openers spaced laterally along the implement frame. A like plurality of singulating meters is provided, each mounted on the frame close to a corresponding furrow opener, and seed tubes are configured to receive singulated seeds from a corresponding singulating meter and deposit the seeds in the furrow created by the corresponding furrow opener. A pressurized air stream conveys seeds through each seed tube and a seed supply supplies seeds to each singulating meter. A meter control operates each singulating meter to provide a variable seeding rate that is independent of the seeding rates of the other singulating meters. A seed catching member follows each furrow opener and catches the seeds exiting the seed tubes to maintain a consistent seed spacing in the furrow.

3 Claims, 8 Drawing Sheets

(51) Int. Cl.
*A01C 7/10* (2006.01)
*A01C 7/04* (2006.01)

(52) U.S. Cl.
CPC .............. *A01C 5/064* (2013.01); *A01C 7/046* (2013.01); *A01C 7/102* (2013.01)

(56) References Cited

U.S. PATENT DOCUMENTS

| | | | |
|---|---|---|---|
| 3,237,702 A | 3/1966 | Orendorff | |
| 3,848,552 A | 11/1974 | Bauman et al. | |
| 4,422,392 A * | 12/1983 | Dreyer | A01C 7/203 |
| | | | 111/134 |
| 4,519,525 A | 5/1985 | Wunschl et al. | |
| 4,580,507 A * | 4/1986 | Dreyer | A01B 61/046 |
| | | | 111/73 |
| 4,608,933 A * | 9/1986 | Wyrill, III | A01C 7/20 |
| | | | 111/152 |
| 4,726,304 A * | 2/1988 | Dreyer | A01C 5/06 |
| | | | 111/73 |
| 5,918,557 A | 7/1999 | Schaffert | |
| 6,082,275 A | 7/2000 | Schaffert | |
| 6,308,645 B1 | 10/2001 | Newkirk et al. | |
| 6,666,156 B1 | 12/2003 | Mayerle et al. | |
| 6,681,706 B2 | 1/2004 | Sauder et al. | |
| 8,336,471 B2 | 12/2012 | Gilstring | |
| 9,137,941 B2 | 9/2015 | Stark | |
| 9,480,199 B2 | 11/2016 | Garner et al. | |
| 2009/0090283 A1 | 4/2009 | Riewerts | |
| 2015/0144039 A1* | 5/2015 | Benko | A01C 23/024 |
| | | | 111/119 |
| 2015/0264857 A1 | 9/2015 | Achen et al. | |
| 2016/0192582 A1* | 7/2016 | Hagny | A01C 5/068 |
| | | | 111/150 |
| 2018/0139894 A1 | 5/2018 | Jagow | |

FOREIGN PATENT DOCUMENTS

| | | | | |
|---|---|---|---|---|
| EP | 2301315 A1 * | 3/2011 | ............. | A01C 5/064 |
| GB | 2176084 A * | 12/1986 | ............... | A01C 5/06 |

* cited by examiner

IMPLEMENT FRAME MOUNTED VARIABLE RATE SINGULATING METERS

This application claims priority to and benefit of U.S. application Ser. No. 15/375,926, filed Dec. 12, 2016, entitled "IMPLEMENT FRAME MOUNTED VARIABLE RATE SINGULATING METERS," which claims priority to and benefit of Canadian Application No. 2949571, filed Nov. 24, 2016, the contents of which are incorporated herein in their entirety for all purposes.

This disclosure relates to the field of agricultural implements and in particular, an air seeder with a singulating meter for each furrow opener, where the singulating meters are mounted on the implement frame that carries the furrow opener assemblies.

BACKGROUND

When seeding crops such as corn it is desirable to plant the corn seeds in a furrow at a pre-determined constant distance from each other. To achieve this constant spacing singulating meters have been developed which dispense seeds one at a time from a hopper full of seeds to a furrow opener. The dispensing rate is correlated to speed of travel over the field such that seeds land in the furrow at a constant spacing distance from each other. In a conventional corn planter, a plurality of row units is attached to a tool bar and each row unit plants one row of seeds. Each row unit has a seed hopper and a singulating meter dispensing seeds one at a time through a seed tube to a furrow made by a furrow opener mounted on the bottom of a furrow opener assembly. Such a corn planter is disclosed for example in U.S. Pat. No. 6,082,275 to Schaffert.

Most of these row units place the singulating meter as close as reasonably possible to the furrow to minimize the distance the seed has to travel in the seed tube in order to minimize the time the seeds are in the tube. Seed travel through the tube can be slowed to a greater or lesser extent, depending on field surface anomalies which cause the row unit to move, by contact with inner walls of the tube which adversely affects seed spacing. Also to minimize wall contact the seed tubes are generally orientated vertically.

Typically the seed tubes curve rearward near their discharge ends so the horizontal velocity component of the exiting seed closely matches the forward travel speed of the row unit in the range of 4.5-5 mph. This results in the relative horizontal velocity between the seeds and the ground being near zero leaving only a vertical velocity component in order to minimize the tendency of seeds to roll along the furrow after contacting the ground which again adversely affects seed spacing.

In general, these known systems work well under good smooth tilled field conditions and slower planting speeds, typically recommend no more than 4.5 mph. However it is now more common to reduce tillage significantly, and often there is no tillage at all on a field prior to seeding, with the result that field surfaces can be quite rough, since humps and hollows made by traffic harvesting a prior crop are not smoothed out by conventional tillage.

Transferring the seeds effectively and consistently from the singulating meter to the furrow is achieved in U.S. Pat. No. 9,480,199 to Garner et al. by replacing the gravity drop seed tube with a brush conveyor system. Similarly, U.S. Pat. No. 6,681,706 to Sauder, et al uses a paddle belt conveyor system.

U.S. Pat. No. 8,336,471 to Gilstring discloses a singulating meter mounted on a row unit where pressurized air is used to singulate the seeds and then also passes in an air stream through the seed tube carrying the seeds with it. In U.S. Pat. No. 9,137,941 to Stark a singulating meter such as disclosed by Gilstring delivers seeds from the meter through a seed tube to the furrow using a pressurized air stream. The pressurized air reduces the effect of speed variances due to contact with the tube walls since the seeds are being forced along the tube by the air stream. The seeds however exit the seed tube at a much higher speed than the ground speed of the implement and so Stark uses a seed catching member such as a wheel or plate to catch the seed as it leaves the seed tube and press it firmly into the bottom of the furrow to prevent the seed from rolling along the furrow.

Means for preventing such rolling and bouncing of seeds is also described in U.S. Pat. No. 5,918,557 to Schaffert. U.S. Pat. No. 6,666,156 to Mayerle et al. discloses a downward biased seed flap pivotally attached rearward of a vertically oriented seed tube to control seed placement. U.S. Pat. Nos. 4,519,525 to Wunschl et al. and 3,848,552 to Bauman et al., and European Patent Number EP0216057 to Dreyer disclose similar seeders where a seed hopper and a singulating meter are mounted on the tool bar and the singulating meter delivers singulated seeds using pressurized air streams to each of a plurality furrow opener assemblies mounted rearward of the tool bar. These implements provide centralized locations for the singulating meters resulting in less complexity and less costly systems, with more convenience in that there is only one seed hopper to fill and clean out.

Implements such as disclosed by Wunschl and Bauman however require a significantly longer delivery tube to transfer the seeds from the singulating meter to the furrow openers, and these tubes are often bent in numerous locations to accommodate mounting the tubes with the input end at the singulating meter and the output end at one of a number of widely spaced furrow openers. As a result, the seeds experience significantly more contact with the tube walls which adversely affects seed spacing.

SUMMARY OF THE INVENTION

The present disclosure provides a seeding apparatus with singulating meters that overcomes problems in the prior art.

Where the singulating meters are mounted on the row units, on rough ground such as typically encountered in no-till operations, the singulating meters experience considerable sudden movement. The small wheels on the row units respond sharply to bumps on the field surface with the result that the singulating meters are jarred quite severely. Seeds often get dislodged from the seed pockets of the singulating meters resulting in a significant number of misses in the seed row where no seed is present, and the jarring also results in much increased contact of the seeds with tube walls, and so uneven seed spacing in the furrow.

In a first embodiment the present disclosure provides a seeding apparatus comprising an implement frame mounted on implement wheels for travel in an operating travel direction, and a plurality of furrow opener assemblies mounted on the implement frame and spaced laterally along the implement frame at a row spacing, each furrow opener assembly comprising a furrow opener operative to create a furrow when engaged in a ground surface. A like plurality of singulating meters is provided, each singulating meter mounted on the implement frame in proximity to a corresponding furrow opener assembly, and a like plurality of seed tubes is each configured at an input end thereof to receive singulated seeds from a corresponding singulating meter and configured at an output end thereof to deposit the seeds in the furrow created by the furrow opener on the corresponding furrow opener assembly. A pressurized air source is configured to provide a seed air stream flowing through each seed tube to convey seeds through each seed tube to the output end thereof, and a seed supply is operative to supply seeds to each singulating meter. A meter control is configured to operate each singulating meter to provide a seeding rate that is independent of the seeding rates of the other singulating meters.

In a second embodiment, the present disclosure provides a seeding apparatus comprising an implement frame mounted on implement wheels for travel in an operating travel direction, and a furrow opener assembly mounted on the implement frame and comprising a furrow opener operative to create a furrow when engaged in a ground surface. A singulating meter is operative to dispense singulated seeds into an input end of a seed tube, and a pressurized air source is configured to provide a seed air stream flowing through the seed tube to convey the seeds through the seed tube to an output end thereof configured to discharge the seeds in a downward and rearward direction into the furrow. A seed catching member is configured to move along a bottom of the corresponding furrow and contact the seeds as the seeds contact the bottom of the furrow. The seed catching member and seed tube are mounted in fixed positions to a follower bracket, and the follower bracket is movable only vertically with respect to the furrow opener assembly. A bias element is operative to exert a downward bias force on the follower bracket with respect to the furrow opener assembly.

The present disclosure thus provides a seeding apparatus for planting singulated seeds with improved consistency of seed spacing by mounting singulating meters on the implement frame rather than on the furrow opener assemblies. The singulating meters are close to the furrow openers to reduce the length of seed tubes required, and there is a separate singulating meter for each furrow opener so each singulating meter can be operated independently at a desired seeding rate to provide for row by row variable rate seeding. A seed catching member follows the output end of the seed tube to contact seeds just as they contact the bottom of the furrow so the seeds are pushed into the soil at the desired location to preserve the desired seed spacing. The seed catching members follow the bottom of the furrow and so must be somewhat movable to follow the furrow bottom as terrain varies. The disclosed apparatus is configured to minimize or eliminate movement of the output end of the seed tube with respect to the seed catching members to maintain at least close proximity to an ideal position where the seed path, seed catching member, and bottom of the furrow meet.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

Figure 1:
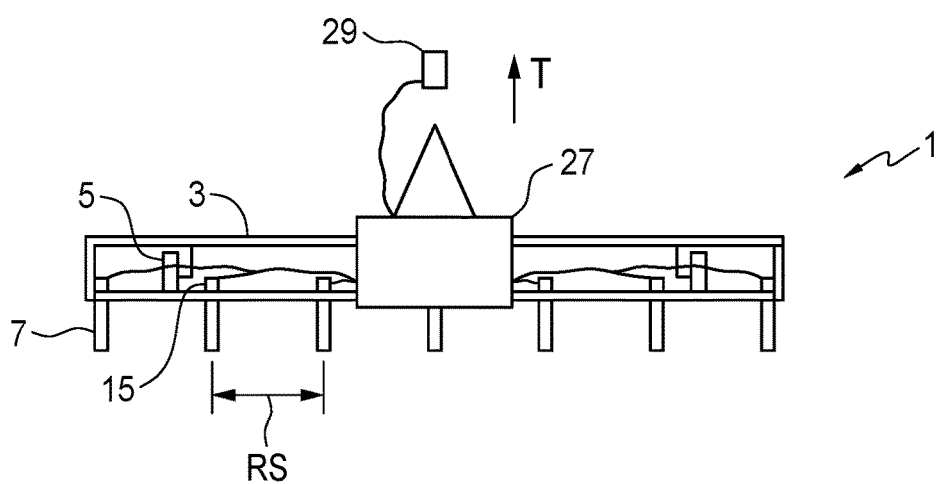
FIG. 1 is a schematic top view of an embodiment of the seeding apparatus of the present disclosure.
Figure 2:
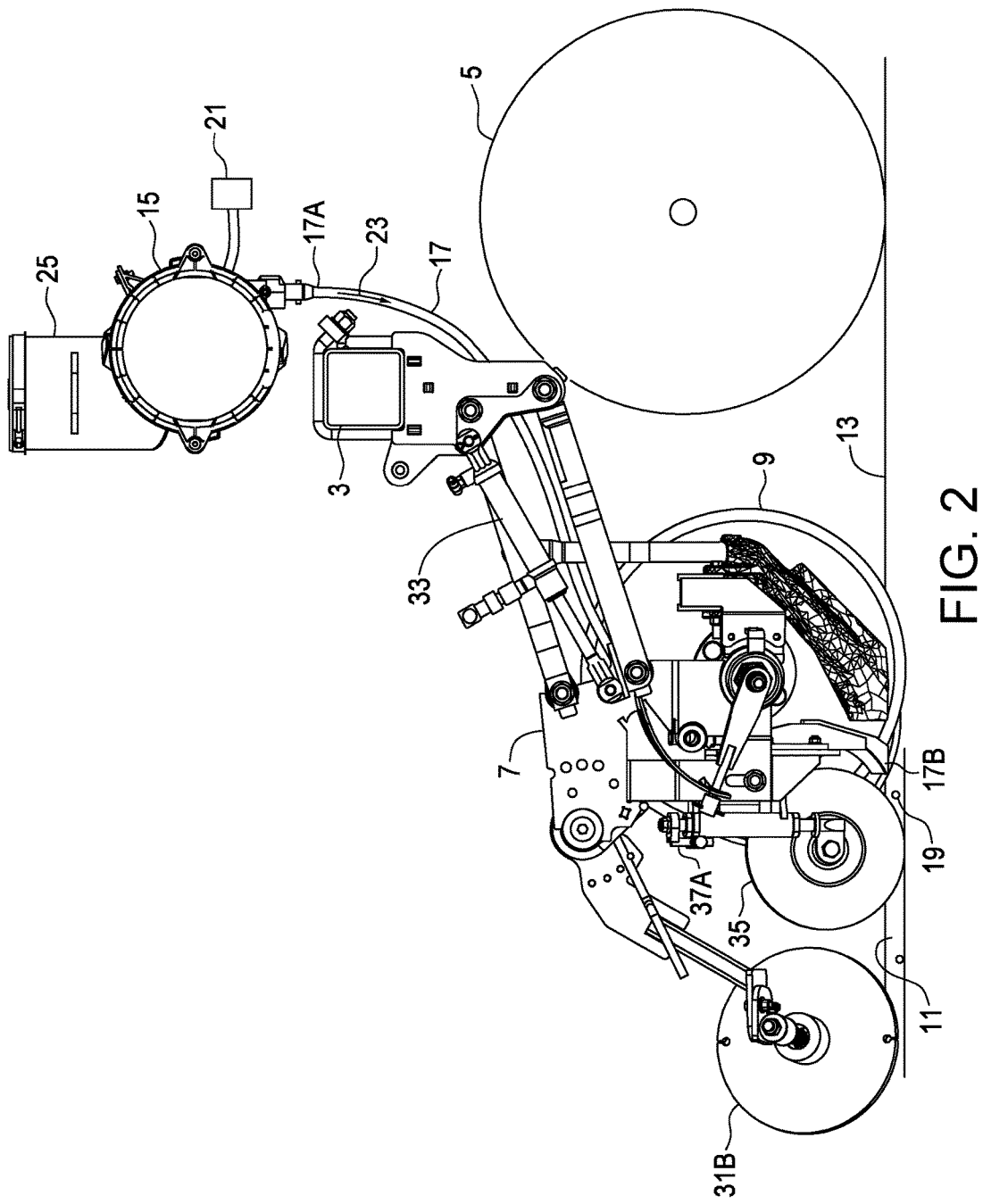
FIG. 2 is a right side view of the embodiment of FIG. 1.
Figure 3:
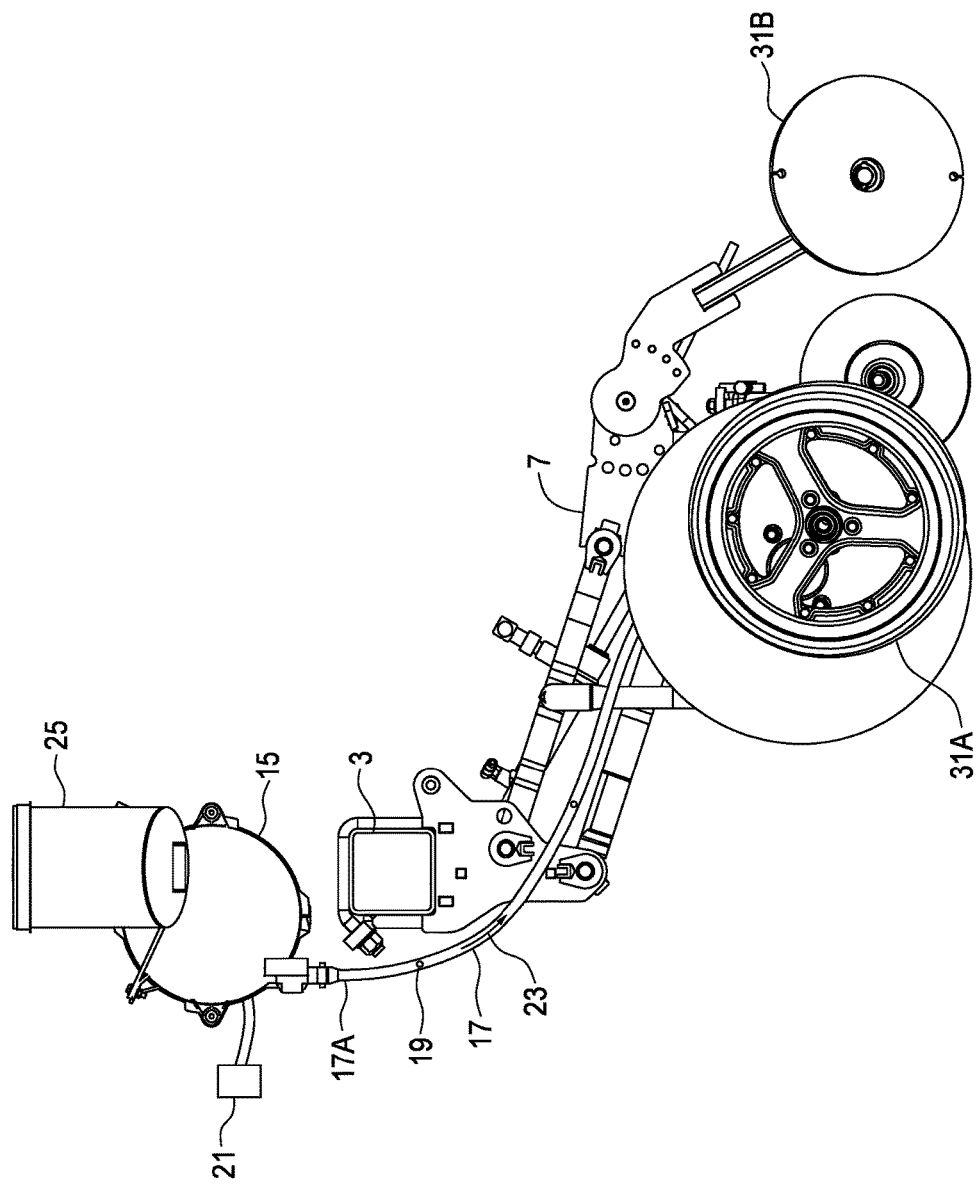
FIG. 3 is a left side view of the embodiment of FIG. 1.

FIG. 1 schematically illustrates an embodiment of a seeding apparatus 1 of the present disclosure. The apparatus 1 comprises an implement frame 3 mounted on implement wheels 5 for travel in an operating travel direction T. A plurality of furrow opener assemblies 7 is mounted on the implement frame 3 and spaced laterally along the implement frame 3 at a row spacing RS. The furrow opener assemblies are illustrated in FIGS. 2 and 3, and each furrow opener assembly comprises a furrow opener 9 operative to create a furrow 11 when engaged in the ground surface 13. The illustrated furrow opener is provided by a single disc as is known in the art, and it is contemplated that the furrow opener could also be provided, again as known in the art, by a knife or hoe. It is also possible that the furrow opener 9 could be provided by the double disc assemblies known in the art, however such double discs assemblies are not often used in the no-till seeding operations where the apparatus 1 will more often be used.

As illustrated further in FIGS. 2-5 the apparatus 1 comprises a like plurality of singulating meters 15, each mounted on the implement frame 3 in proximity to a corresponding furrow opener assembly 7, and a like plurality of seed tubes 17, each configured at an input end 17A thereof to receive singulated seeds 19 from a corresponding singulating meter 15 and configured at an output end thereof to deposit the seeds 19 in the furrow 11 created by the furrow opener 9 on the corresponding furrow opener assembly 7.

A pressurized air source 21 is configured to provide a seed air stream 23 flowing through each seed tube 17 to convey seeds 19 through each seed tube to the output end 17B thereof. Conveniently the singulating meters 15 will be of the type known in the art where pressurized air is used to singulate the seeds and then also passes in an air stream through the seed tube.

A seed supply is operative to supply seeds 19 to each singulating meter 15. In the illustrated apparatus 1 as is known in the art the seed supply is a small seed container 25 mounted on the singulating meter 15, and a large seed tank 27 mounted on the implement frame 3 which transfers seeds to the seed container 25 as required. The seed supply could also be provided as in conventional row crop seeding implements by providing a larger seed container above each singulating meter 15, however filling the individual containers is time consuming and the nurse system illustrated is becoming popular as filling the single large seed tank 27 instead of the plurality of smaller ones saves considerable time when filling.

In the apparatus 1 all the weight of the seed containers 25, seed tank 27, and singulating meters 15 is carried on the implement frame 3 and supported on implement wheels 5 as shown in FIG. 2 which are, as is typical with such seeding implements, of a significantly larger diameter than the gauge wheels 31A which support each furrow opener assembly 7 and set the depth of the furrow 11, and furrow closer wheels 31B which are biased downward and also partially support the furrow opener assembly 7. A portion of that weight is transferred to the furrow opener assemblies 7 through hydraulic cylinders 33 to exert down pressure on the furrow openers 9 however, especially when the seed tank 27 is full, considerable weight is supported on the implement frame 3.

On the relatively rough ground surfaces 13 encountered when practicing no-till agricultural operations the furrow opener assemblies 7, supported on the relatively small diameter gauge and closer wheels 31A, 31B, experience considerable up and down sudden jarring movement. When the singulating meters are conventionally mounted on the furrow opener assemblies 7 these jarring movements can dislodge seeds from the seed pockets of the singulating meters 15 causing misses disrupting the smooth and regular dispensing of single seeds, which operation is required in order to achieve the desired consistent selected seed spacing. The present apparatus 1 mounts the singulating meters 15 on the implement frame 3 which, because of its considerable weight and larger diameter implement wheels 5, experiences much smoother travel over rough ground, significantly reducing the occurrence of misses.

In prior art seeding systems where a singulating meter mounted on the implement frame 3 uses pressurized air streams to deliver singulated seeds to several furrow opener assemblies mounted rearward of the tool bar, the singulating meter is quite far from some of the furrow openers and the seed tubes become quite long with a significant number of bends so there is considerable contact between the seeds and the walls of the seed tubes which disrupts the flow of seeds and adversely affects seed spacing In the apparatus 1 the singulating meters 15 are mounted on the implement frame 3 in close proximity to the corresponding furrow opener assemblies 7 so that the length of the seed tubes 17 can be kept to shortest length possible, thus reducing the disruptive contact of seeds 19 with walls of the seed tubes 17.

Providing a separate singulating meter 15 for each furrow opener 9 also provides the significant benefit of allowing independent seed rates in each row of the field. A meter control 29, typically located on a towing tractor, is configured to operate each singulating meter 15 to provide a seeding rate that is independent of the seeding rates of the other singulating meters. Thus, the seed dispensing rate for each singulating meter 15 can be controlled to follow a variable seeding rate map, or provide consistent seed spacing during turns.

Figure 4:
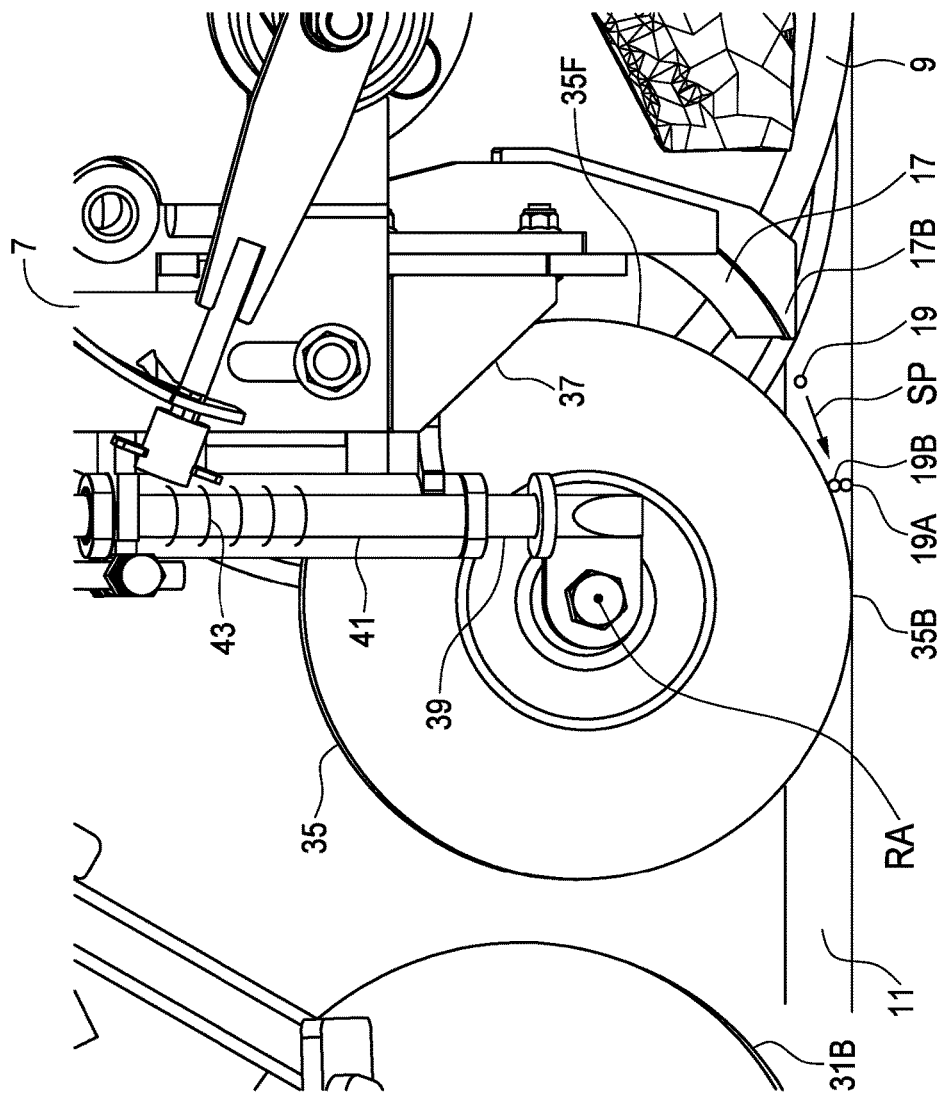
FIG. 4 is a right side downward perspective view showing the seed catching member mounted to the furrow opener of the embodiment of FIG. 1.
Figure 5:
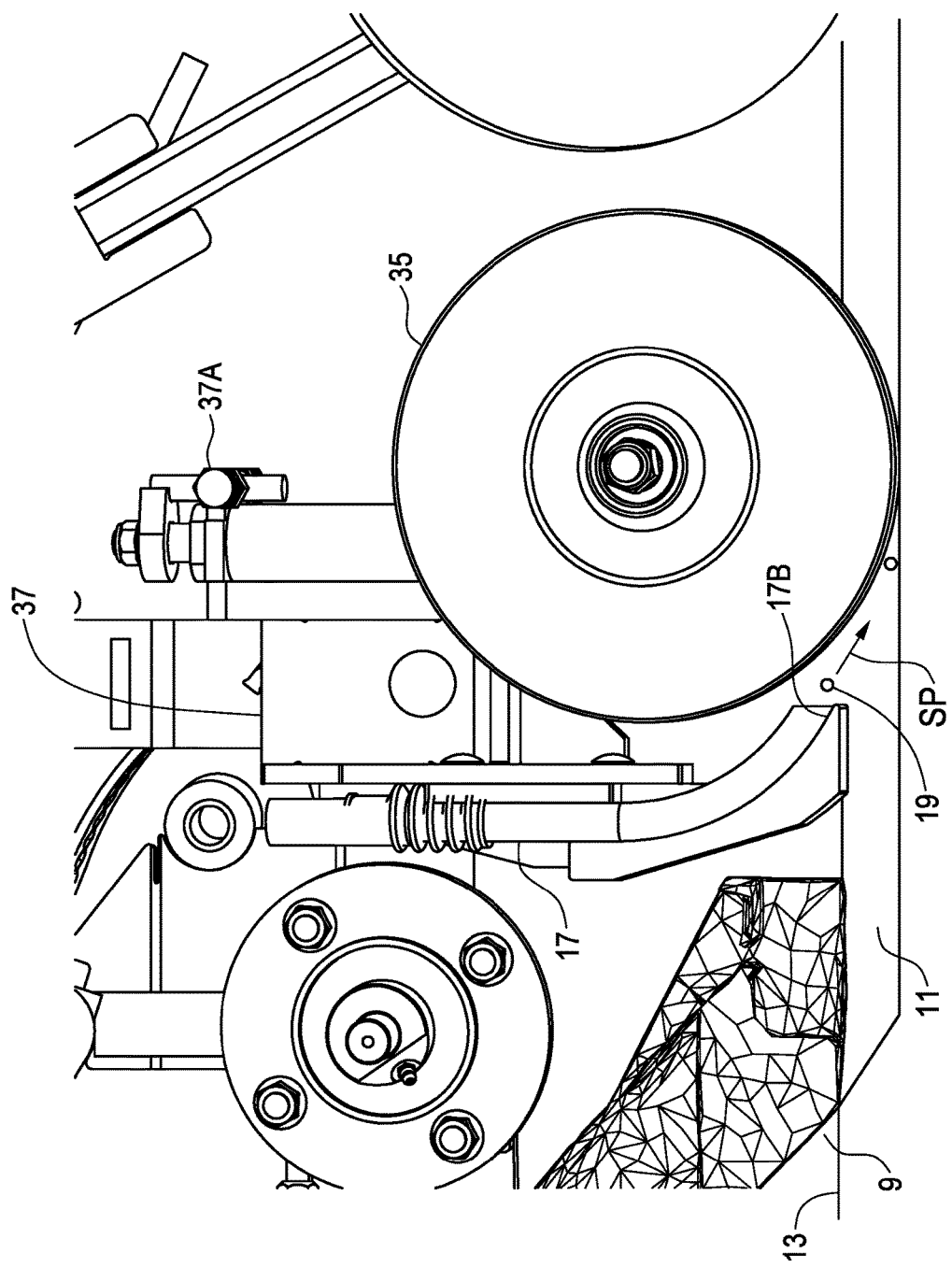
FIG. 5 is a left side upward perspective view showing the seed catching member mounted to the furrow opener assembly of the embodiment of FIG. 1.

As illustrated in particular in FIG. 4 each seed tube 17 is configured to discharge seeds 19 in a downward and rearward direction along a seed path SP, and each furrow opener assembly 7 comprises a seed catching member configured move along a bottom of the corresponding furrow 11 and contact the seeds 19 as the seeds 19 contact the bottom of the furrow 11.

In the illustrated furrow opener assemblies 7, the seed catching member is provided by a seed wheel 35 that is movable only vertically up and down with respect to the output end 17B of the seed tube 17, and the seed wheel 35 is biased in a downward direction with respect to the output end 17B of the seed tube 17. The seed catching member, seed wheel 35, and seed tube 17 are mounted to a common bracket 37 of the furrow opener assembly 7. The position of the common bracket 37 with respect to the furrow opener 9 of the furrow opener assembly 7 is adjustable to allow repositioning to compensate for wear on the furrow opener 9 or like parts. Mounting the seed wheel 35 and seed tube 17 to the common bracket maintains the relative position of the seed catching seed wheel 35 with respect to the output end 17B of the seed tube 17 when wear compensation adjustments are made.

The relative positions of the output end 17B of the seed tube 17 and the seed wheel 35 are arranged so that the seed wheel 35 contacts the seeds 19 as the seeds 19 contact the bottom of the furrow 11, however because of the necessity to follow the furrow bottom and also terrain anomalies in the field it is desirable to allow some movement of the seed wheel 35 with respect to the output end 17B of the seed tube 17. The output end 17B of the seed tube 17 is fixed with respect to the common bracket 37 and the seed catching seed wheel 35 is mounted to the common bracket 37 such that the seed wheel 35 can move only vertically up and down with respect to the common bracket 37. The seed wheel 35 is rotatably mounted about a substantially horizontal rotational axis RA to a vertical shaft 39 that is movable only up and down in a channel 41 of the common bracket 37. Rotation of the shaft 39 with respect to the common bracket 37 is prevented by a rotation lock 37A on the common bracket 37. A bias element provided by a spring 43 is configured to exert a downward bias force on the vertical shaft 39 to maintain contact between the seed wheel 35 and the bottom of the furrow 11.

A forward edge 35F of the seed wheel is forward of the output end 17B of the seed tube 17, and the seed wheel 35, the output end 17B of the seed tube 17, and the furrow 11 are configured such that seeds 19 exiting the seed tube 17 contact the bottom of the furrow 11 adjacent to the bottom edge 35B of the seed wheel 35 as in seed 19A or contact the seed wheel 35 adjacent to the bottom of the furrow 11 as in seed 19B. This generally simultaneous contact between the seed wheel 35, bottom of the furrow 11 and the seeds 19 prevents any significant movement of the seeds 19 out of their desired location. The position of the bottom of the seed wheel 35 at the bottom of the furrow 11 is maintained by the downward force of the spring 43 so it is only the position of the output end 17B of the seed tube 17 that varies vertically somewhat up and down from the ideal position where the seed path SP, seed wheel 35, and bottom of the furrow 11 meet. Movement is only vertical, with no forward or rearward movement as in pivotally attached seed catching seed wheels, such that the range of movement away from the ideal position is reduced and consistency of seed spacing is enhanced.

Figure 6:
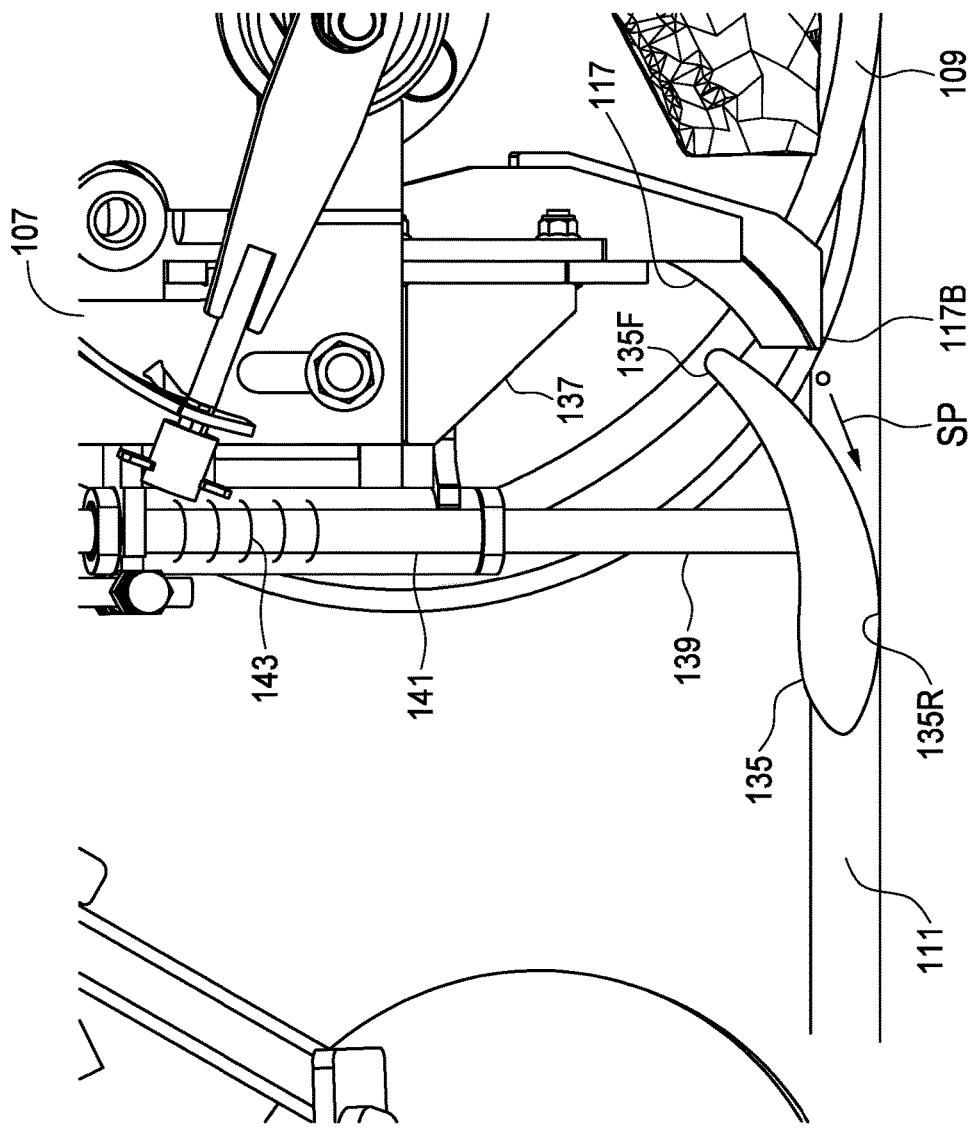
FIG. 6 is a right side view of an alternate seed catching member for mounting to the furrow opener assembly of the embodiment of FIG. 1.

FIG. 6 schematically illustrates an alternate furrow opener assembly 107 where the seed catching member comprises a seed finger 135. The seed finger 135 and seed tube 117 are mounted to a common bracket 137, and the position of the common bracket 137 is adjustable with respect to the furrow opener 109 of the furrow opener assembly. A front end 135F of the seed finger 135 is located above and in proximity to the output end 117B of the seed tube 117 and a rear portion 135R thereof located at the bottom of the furrow 111.

Similar to the seed wheel 35 in the above described furrow opener assembly 7, the seed finger 135 is attached to a vertical shaft 139 that is movable only up and down in a channel 141 of the common bracket 137, and a spring 143 exert a downward bias force on the vertical shaft 139 and the seed finger 135.

The position of the bottom of the seed finger 135 at the bottom of the furrow 111 is maintained by the downward force of the spring 143 so it is only the position of the output end 117B of the seed tube 117 that varies vertically somewhat up and down from the ideal position where the seed path SP, seed finger 135, and bottom of the furrow 111 meet.

Figure 7:
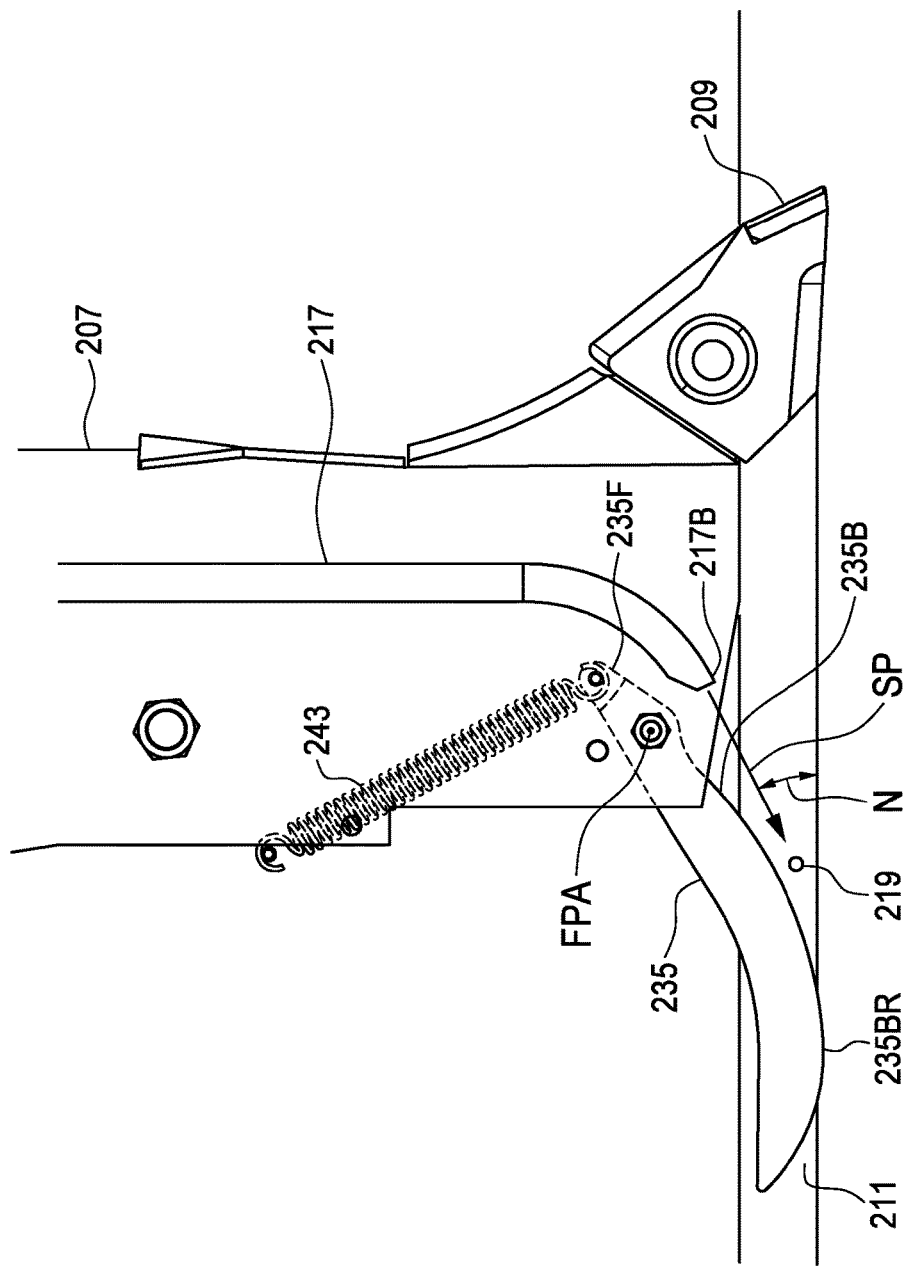
FIG. 7 is a right side view of an of an alternate seed catching member mounted to a furrow opener assembly where the furrow opener is provided by a knife.

FIG. 7 schematically illustrates a further alternate furrow opener assembly 207 where the furrow opener 209 is provided by a knife opener as is known in the art, and the furrow opener assembly typically comprises a packer wheel rolling along the furrow rearward of the furrow opener 209 that sets the furrow depth and packs the seed in the furrow 211. The seed catching member comprises a seed finger 235 with a front end 235F thereof pivotally mounted to the furrow opener assembly 207 about a substantially horizontal finger pivot axis FPA located above and in close proximity to the output end 217B of the seed tube 217. The seed finger 235 is configured such that a bottom surface 235B thereof stays at a location above and in proximity to a seed path SP of seeds 219 exiting the output end 217B of the seed tube 217 as a rear portion 235BR of the bottom surface 235B of the seed finger 235 moves along the bottom of the corresponding furrow 211 and the seed finger 235 pivots up and down in response to variations in terrain.

The seed tube 217 is oriented upright and curves rearward near the output end 217B thereof such that seeds 219 exit the output end 217B of the seed tube 217 along a seed path SP oriented at an angle N about 10 to 40 degrees up from horizontal, and the bottom surface 235B of the seed finger 235 curves downward from the finger pivot axis FPA toward the seed path SP. A bias element, illustrated as a spring 243, is operative to exert a downward bias force on the seed finger 235 so the bottom surface 235B of the seed finger 235 follows the bottom of the furrow 211.

While the illustrated furrow opener 209 is a knife it is contemplated that a single or double disc opener could be utilized as well.

Figure 8:
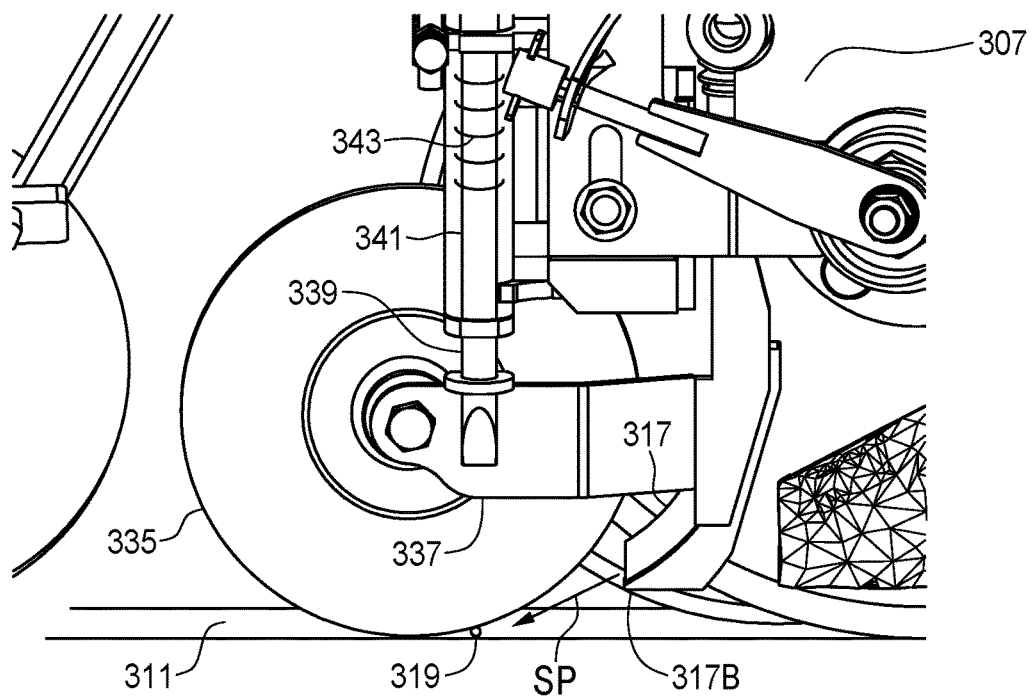
FIG. 8 is a schematic side view of an alternate furrow opener assembly where the seed catching member is a seed wheel, and wherein the seed wheel and the output end of the seed tube are in fixed positions with respect to each other and move up and down together to follow the bottom of the furrow.

FIG. 8 schematically illustrates an alternate furrow opener assembly 307 where wherein on each furrow opener assembly 307 the seed catching member, here provided by a seed wheel 335 and seed tube 317 are mounted in fixed positions to a follower bracket 337, which is movable only vertically with respect to the furrow opener assembly 307. The seed wheel 335 is rotatably mounted about a substantially horizontal rotational axis RA to the follower bracket 337 such that the rotational axis RA is fixed with respect to the output end 317B of the seed tube 317. The follower bracket 337 is attached to a vertical shaft 339 that is movable only up and down in a channel 341 of the furrow opener assembly 307. A bias element, provided by a spring 343, is configured to exert a downward bias force on the vertical shaft 339 to exert a downward bias force on the follower bracket 337 with respect to the furrow opener assembly 307.

Figure 9:
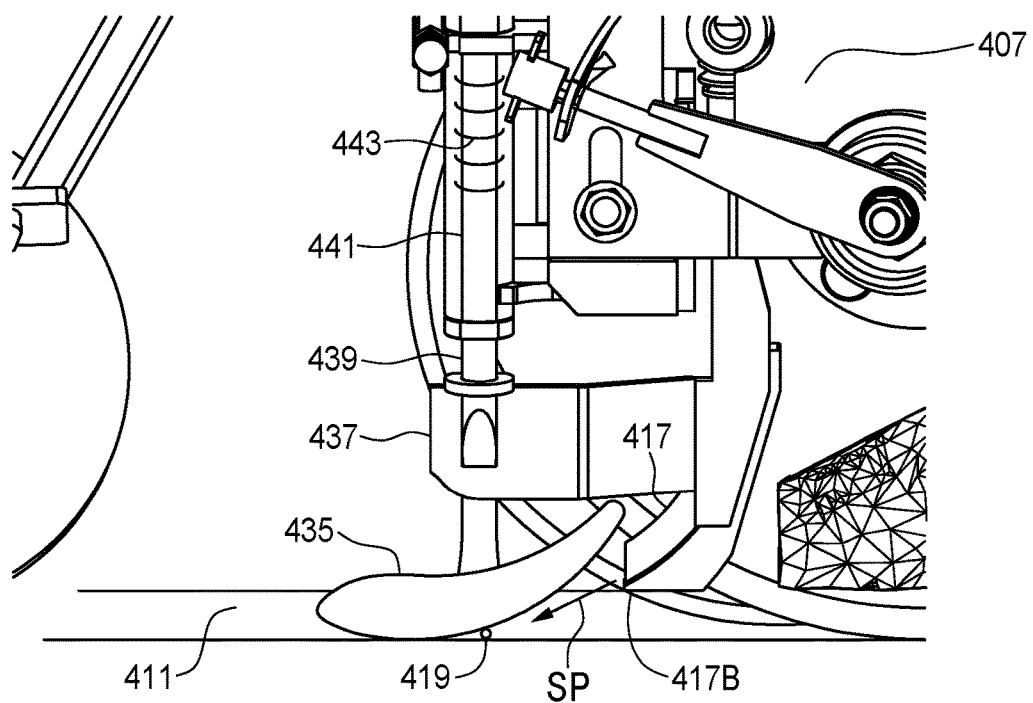
FIG. 9 is a schematic side view of a further alternate furrow opener assembly where the seed catching member is a seed finger, and wherein the seed finger and the output end of the seed tube are in fixed positions with respect to each other and move up and down together to follow the bottom of the furrow.

In this version of the furrow opener assembly 307 the bottom of the seed wheel 335 follows the bottom of the furrow 311, and the position of the output end 317B of the seed tube 317 is fixed with respect to the bottom of the seed wheel 335. Thus the relative positions of the bottom of the furrow 311, the seed catching seed wheel 335, and output end 317B of the seed tube 317 are fixed such that as the seed wheel 335 moves up and down somewhat to follow the bottom of the furrow 311 in varying terrain the output end 317B of the seed tube 317, and the seed path SP, remain in the same relative position with respect to the seed wheel 335 so that the seed wheel 335 contacts the seeds 319 as the seeds 319 contact the bottom of the furrow 311, FIG. 9 schematically illustrates a further alternate furrow opener assembly 407 where wherein on each furrow opener assembly 407 the seed catching member, here provided by a seed finger 435 and seed tube 417 are mounted in fixed positions to a follower bracket 437, which is movable only vertically with respect to the furrow opener assembly 407. The seed finger 435 is mounted to the follower bracket 437 in a fixed position with respect to the output end 417B of the seed tube 417. The follower bracket 437 is attached to a vertical shaft 439 that is movable only up and down in a channel 441 of the furrow opener assembly 407. A bias element, provided by a spring 443, is configured to exert a downward bias force on the vertical shaft 439 to exert a downward bias force on the follower bracket 437 with respect to the furrow opener assembly 407.

In this version of the furrow opener assembly 407 the bottom of the seed finger 435 follows the bottom of the furrow 411, and the position of the output end 417B of the seed tube 417 is fixed with respect to the bottom of the seed finger 435. Thus the relative positions of the bottom of the furrow 411, the seed catching seed finger 435, and output end 417B of the seed tube 417 are fixed such that as the seed finger 435 moves up and down somewhat to follow the bottom of the furrow 411 in varying terrain the output end 417B of the seed tube 417, and the seed path SP, remain in the same relative position with respect to the seed finger 435 so that the seed finger 435 contacts the seeds 419 as the seeds 419 contact the bottom of the furrow 411.

The present disclosure thus provides a seeding apparatus for planting singulated seeds with improved consistency of seed spacing by mounting singulating meters 15 on the implement frame 3 rather than on the furrow opener assemblies 7. The singulating meters 15 are close to the furrow openers 9 to reduce the length of seed tubes 17 required, and there is a separate singulating meter 15 for each furrow opener 9. The singulating meters 15 can each be operated independently at a desired seeding rate to provide for row by row variable rate seeding. A seed catching member follows the output end 17B of the seed tube 17 to contact seeds just as they contact the bottom of the furrow so the seeds are pushed into the soil at the desired location to preserve the desired seed spacing. The seed catching members follow the bottom of the furrow 11 and so must be somewhat movable to follow the furrow bottom as terrain varies The disclosed apparatus is configured to minimize or eliminate movement of the output end of the seed tube with respect to the seed catching members to maintain at least close proximity to an ideal position where the seed path SP, seed catching member, and bottom of the furrow meet.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A seeding apparatus comprising:
   an implement frame mounted on implement wheels for travel in an operating travel direction;

a furrow opener assembly mounted on the implement frame and comprising a furrow opener operative to create a furrow when engaged in a ground surface;

a singulating meter operative to dispense singulated seeds into an input end of a seed tube, and a pressurized air source configured to provide a seed air stream flowing through the seed tube to convey the seeds through the seed tube to an output end thereof configured to discharge the seeds in a downward and rearward direction into the furrow;

a seed catching member configured to move along a bottom of the corresponding furrow and contact the seeds as the seeds contact the bottom of the furrow;

wherein the seed catching member and seed tube are mounted in fixed positions to a follower bracket, and wherein the follower bracket is movable only vertically with respect to the furrow opener assembly, and comprising a bias element operative to exert a downward bias force on the follower bracket with respect to the furrow opener assembly.

2. The apparatus of claim 1 wherein the seed catching member comprises a seed wheel rotatably mounted about a substantially horizontal rotational axis to the follower bracket such that the rotational axis is fixed with respect to the output end of the seed tube, and wherein the follower bracket is attached to a vertical shaft that is movable only up and down in a channel of the furrow opener assembly, and wherein the bias element comprises a spring configured to exert the downward bias force on the vertical shaft.

3. The apparatus of claim 1 wherein the seed catching member comprises a seed finger mounted to the follower bracket in a fixed position with respect to the output end of the seed tube, and wherein the follower bracket is attached to a vertical shaft that is movable only up and down in a channel of the furrow opener assembly, and wherein the bias element comprises a spring configured to exert the downward bias force on the vertical shaft.

* * * * *